United States Patent Office 3,567,543
Patented Mar. 2, 1971

3,567,543
METHOD OF MANUFACTURING A FIBRE REINFORCED RESIN STRUCTURE
Arthur E. Standage, Nottingham, and William Neil Turner, Derby, England, assignors to Rolls-Royce Limited, Derby, England
No Drawing. Filed July 7, 1967, Ser. No. 651,663
Claims priority, application Great Britain, July 23, 1966, 33,241/66
Int. Cl. B29d 7/14; B32h 54/00
U.S. Cl. 156—174
9 Claims

ABSTRACT OF THE DISCLOSURE

A method of producing a fibre reinforced resin structure using a resin which is intractable in its cured form but which has a tractable intermediate formed during its synthesis. The method consists of coating layers of the fibres with the tractable intermediate in the form of a resin solution, partly curing the individual layers, applying a further coating of the resin to each layer, pressing the layers together and finally completely curing the composite structure.

---

This invention relates to a method of manufacturing a fibre reinforced resin structure and the structure produced by this method.

Modern technology requires strong, low density high temperature resistant materials. Fibre reinforced resin has been used to replace metal parts where the weight has to be minimised. At present most commercial resins can only stand a temperature of up to 250° C. for continuous use.

Any increase in this temperature limit would be advantageous and in recent years, a new generation of heat resistant polymers have been developed which can be used for resins which can stand temperatures in the region of 350 to 500° C. for appreciable lengths of time. These polymers have aromatic or heterocyclic ring systems incorporated in the molecular chains. Aromatic systems have optimum chemical resistance at high temperature and confer rigidity on the constituent macromolecules, thereby preventing serious degradation of the mechanical properties on heating.

As a consequence of their molecular structure many of these polymers are both insoluble and infusible. Although these are desirable properties in a fabricated structure, they give rise to difficulty in fabrication techniques.

However, the synthesis of a number of such resins involves a soluble intermediate product and the present invention makes use of this intermediate in the form of a resin solution to provide a way of manufacturing structures in such resins reinforced with fibres.

According to the present invention a method of manufacturing a fibre reinforced resin structure comprises the steps of coating at least one layer of fibre with a resin solution, partly curing the layer or layers so as to form a reinforced film or films, applying a further thin coating of resin solution to at least one surface of each film, pressing a plurality of the coated films together and finally curing the composite structure.

Each layer of fibres may be formed by winding a continuous length of fibre on a drum, the layer being coated while still on the drum.

Each fibre may be coated with a layer of resin before it is wound on the drum.

The curing steps may be effected by heating.

The resin may be a polyimide resin and the fibres may comprise silica or carbon.

An example of the present invention will now be particularly described.

For this example a polyimide resin was selected, these resins being convenient because their synthesis is carried out in two steps and involves a soluble high molecular weight polymer intermediate. As a particular material poly-($N_1$ $N^1$-(4,$4^1$ oxydiphenylene) pyromellitimide was selected for use. In order to produce this material pyromellitic dianhydride was purified by recrystallisation in acetic anhydride under an atmosphere of dry nitrogen to yield a product melting at 287 to 288° C.

4,$4^1$-diaminodiphenyl had a melting point of 191–2° C. after recrystallisation in ethyl acetate.

N,N-dimethylformamide which was used as a solvent for the reaction was distilled under reduced pressure in a dry nitrogen atmosphere after shaking first with phosphorous pentoxide and subsequently with potassium hydroxide pellets.

The soluble intermediate product in the form of a resin solution was prepared in a dry atmosphere by adding an equimolar amount of finely powedered pyromellitic dianhydride to a solution of the amine in N,N-dimethylformamide. The reaction vessel was cooled to absorb any heat of reaction which might cause degradation of the polyamide-acid. The prepared solution contained 17% by weight of solids and was stored in sealed flasks at 0° C.

Silica fibre which was used for reinforcing the resin was produced continuously by drawing out a silica rod to a diameter of .0017 in. using an oxy-coal gas flame. The fibre was then coated with a thin protective layer of polymer in order to protect it from mechanical damage. This was carried out by passing the fibre through a .01 in. gap between two polytetrafluorethylene capillary tubes. A resin solution containing 35% by weight of acetone was fed under pressure via the capillaries onto the fibre and the coated fibre was quickly dried by passing out through a furnace maintained at 400° C. A coating of about .0001 in. in thickness was produced and was smooth and uniform.

A coil winding machine was then used to wind the coated fibre on a 12 in. diameter drum coated with polytetrafluorethylene sheet, the spacing between the fibres being carefully controlled at .0026 in.

The winding of the fibre thus formed was then sprayed with the resin solution diluted with N,N-dimethylformamide and dried by a cold air blast. The resulting unidirectionally reinforced sheet was stripped off the drum and partially cured by heating to 200° C. over a period of 100 minutes in a nitrogen atmosphere.

The sheet was then sprayed with a resin solution diluted with solvent to produce a very thin interlaminar bonding surface which was dried by an air blast. A number of strips were then cut from the sheet and the strips were moistened with solvent on their prepared bonding surface and pressed together in a mould under a pressure of 1000 lbs./in.². Release from the mould was facilitated by using polytetrafluorethylene mould liners and removing excess solvent under vacuum. 40 strips were bonded together in a typical sample giving a final thickness of 0.07 in.

The pieces thus produced were then clamped between flat stainless steel plates and cured by heating from room temperature to 325° C. at a rate of rise of temperature of 5° C. per hour in an atmosphere of nitrogen. The stainless steel plates were instrumental in preventing blistering caused by the evolution of volatiles during the curing.

Test pieces made by this method were found to be of uniform dense structure, were nonporous and gave good results on structural testing.

It will be noted that by partially curing the films before they are bonded together the evolution of water during the curing process of the composite pieces is considerably reduced, therefore avoiding to a large extent the breaking up of the molecular chains by the attack of water thus evolved which is strapped in the structure which is also made porous by the evolution of water. When the curing takes place while the material is still in the film condition the relatively large surface area enables evolved water to escape without attacking the molecular chains. By only partially curing the films and spraying on the thin bonding layer of resin a good bond is produced between the films which would be difficult to obtain between completely cured films. Using the present method the pressure used in bonding the films together is relatively small and does not cause serious degradation of the properties of the structure and eliminates porosity.

Although the present invention has been illustrated with reference to polyimide and silica fibres it would be possible to use other resins and other fibres. Thus carbon fibres would be suitable in the method of the invention and any other strong fibre which was compatible with the resin could be used. Any resin whose synthesis involves a reasonably tractable intermediate product could be used as the matrix material; examples of such resins are the polyquinoxalines, polybenzimidazols, polythiazoles and pyrrones.

We claim:
1. In a method of manufacturing a fiber reinforced resin structure comprising the steps of:
 (a) coating each of a plurality of layers of fiber with a solution of a soluble high molecular weight intermediate of a resin,
 (b) applying a further coating of resin solution to one surface of each of said layers,
 (c) pressing a plurality of said coated layers together, and
 (d) curing the resulting composite structure,
the improvement of only partially curing by heating each of said coated layers as coated in step (a) forming a plurality of separate reinforced films, evolving water from each of said coated layers during said heating thereby substantially reducing the amount of water present during the final curing step.

2. A method as claimed in claim 1 and in which each fibre is individually coated with a layer of resin before laying up into said layers.

3. A method as claimed in claim 1 and in which said curing step (d) is effected by heating.

4. A method as claimed in claim 1 and in which each layer of fibres is formed by winding a continuous length of fibre on to a drum.

5. A method as claimed in claim 4 and in which said layer of fibres is coated while wound on the drum.

6. A method as claimed in claim 1 and in which said resin is a polyimide.

7. A method as claimed in claim 6 and in which said resin is poly-$(N_1 N^1$-$(4,4^1$ oxydiphenylene) pyromellitimide).

8. A method as claimed in claim 1 and in which said fibre is a silica fibre.

9. A method as claimed in claim 1 and in which said fibre is a carbon fibre.

References Cited

UNITED STATES PATENTS

| | | | |
|---|---|---|---|
| 2,131,024 | 9/1938 | Cordts | 156—174X |
| 2,572,407 | 10/1951 | Falet al. | 156—174 |
| 2,943,968 | 7/1960 | Freeman et al. | 156—174X |
| 3,036,946 | 5/1962 | Jackson | 156—174 |
| 3,046,180 | 7/1962 | Diehl et al. | 156—246 |
| 3,361,589 | 1/1968 | Lindsey | 156—331 |
| 3,413,640 | 11/1968 | Freeman et al. | 156—331X |
| 3,371,009 | 2/1968 | Traynor et al. | 156—331X |

BENJAMIN R. PADGETT, Primary Examiner

U.S. Cl. X.R.

156—173, 181, 331